July 28, 1942.  S. M. UDALE  2,290,921
FUEL INJECTION SYSTEM
Filed July 5, 1940  2 Sheets-Sheet 1

INVENTOR.
BY Stanley M. Udale

Patented July 28, 1942

2,290,921

UNITED STATES PATENT OFFICE 2,290,921

FUEL INJECTION SYSTEM

Stanley M. Udale, Detroit, Mich., assignor to George M. Holley and Earl Holley

Application July 5, 1940, Serial No. 344,029

7 Claims. (Cl. 123—140)

In the operation of fuel injection engines for aircraft uses, it is desirable to permit the supercharged air to scavenge the cylinders. By this means the cylinder is filled with pure air during the compression stroke and it follows from this that there will be a larger amount of fuel consumed and therefore, a larger amount of pure air consumed. Theoretically this increase should amount to about 14% with a 7 to 1 compression ratio. Actually, of course, it will be somewhat less. In order that scavenging may take place, it is necessary that the inlet valve remain open during part of the time that the exhaust valve is opened. With fuel injection in the inlet manifold, or with ordinary carburetor installations, this is not possible because the scavenging air would carry with it fuel which would be wasted.

When the valves overlap for scavenging, there is a noticeable difficulty when the engine is idled down with a closed throttle. The supercharger pressure is then considerably below atmosphere. Therefore, instead of the supercharger scavenging the cylinder, the situation is reversed and the gases in the cylinder pollute the pure air in the supercharger. To avoid this, it has been proposed that a throttle valve be fitted to each individual cylinder at the air entrance to the inlet manifold. The control of such valves would be rather difficult in an in-line engine. It is still more difficult in a radial engine.

The object of this invention, therefore, is to control the individual throttles automatically so that as the fuel supply is restricted due to the lower pressure in the supercharger due to the closure of the main throttle, the air is restricted a second time at the inlet valve by another throttle.

At the same time it is the object of this invention to regulate the supply of fuel to correspond to the actual density of the cylinder at the time the inlet valve closes. This, of course, will give a rich mixture when the engine is idling, but engines will only idle satisfactorily on a rich mixture so this is not objectionable. The reason the mixture will be rich when idle is because some exhaust gases will contaminate the air when idling.

Individual fuel injection pumps are fitted to each cylinder and these pumps are regulated by the well known rack and pinion method which gives both a variable admission and a variable cut off during the piston stroke, corresponding to certain operations of the compression stroke so that fuel is injected during the compression stroke exactly as in a Diesel engine.

The invention is illustrated by two diagrammatic figures.

Figure 1:
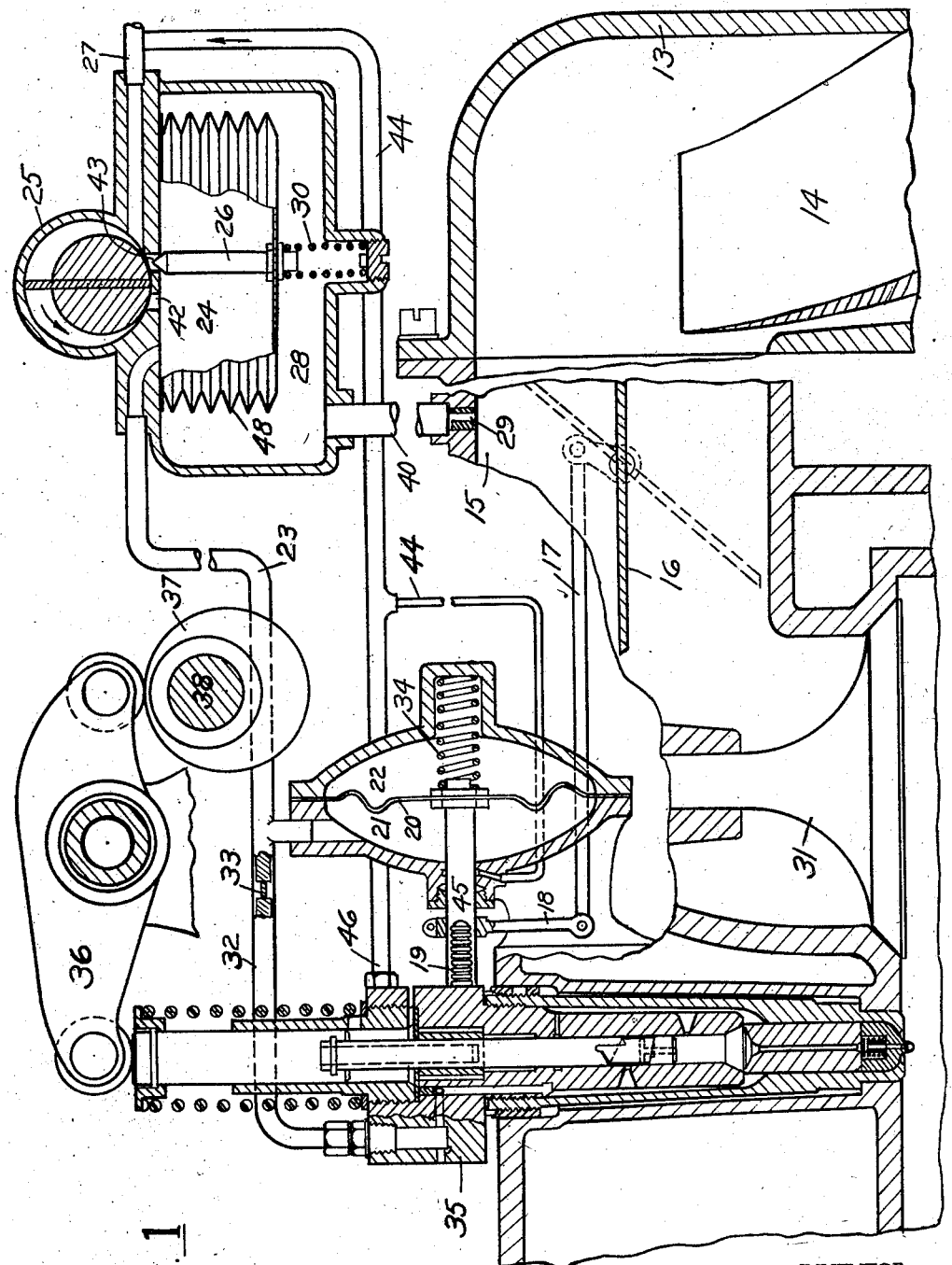
Figure 1 shows the arrangement of the supercharger and one cylinder.
Figure 2:
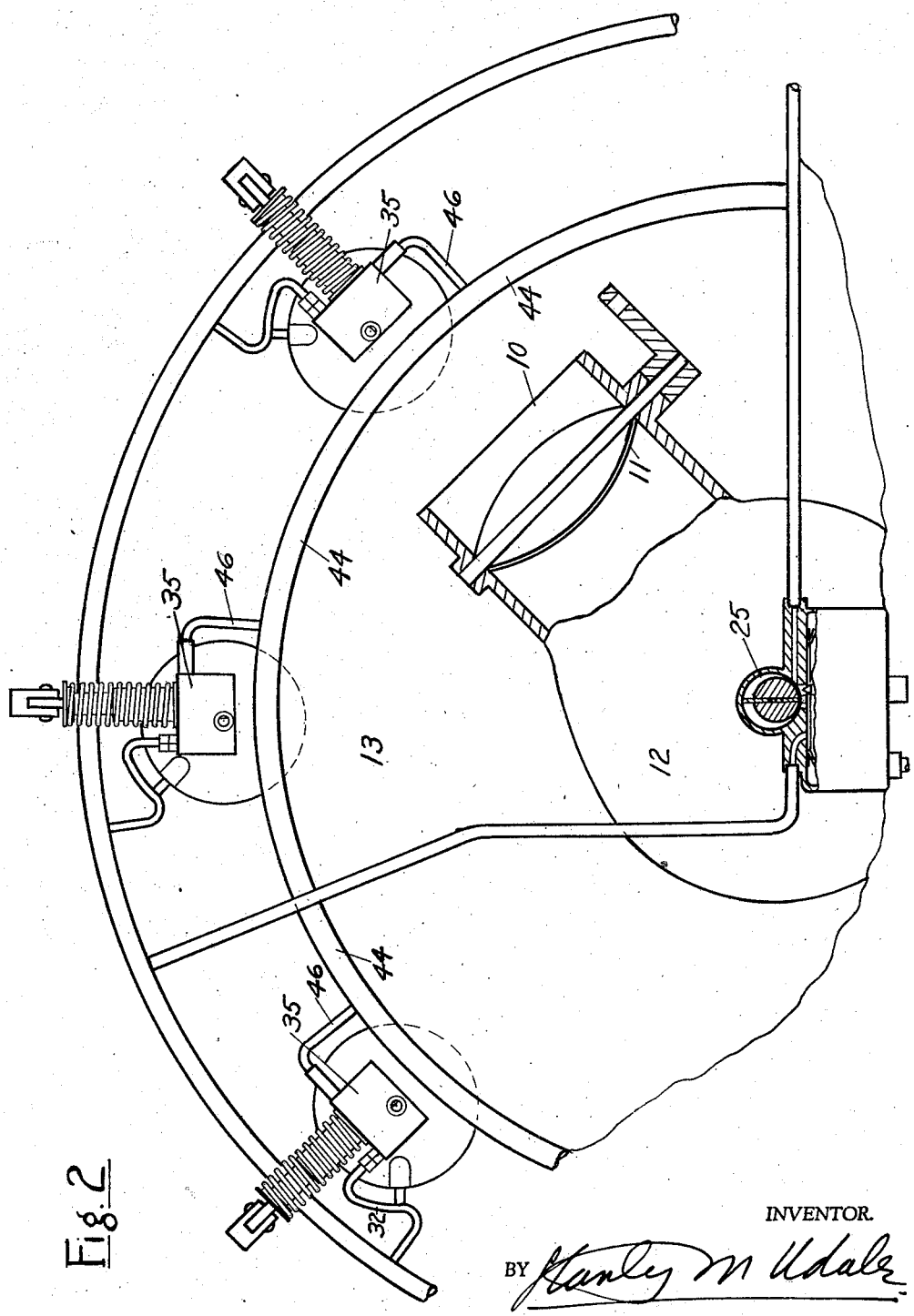
Figure 2 shows the arrangement of three of the individual pumps on a radial engine.

In Figure 2, 10 is the air entrance controlled by a throttle 11. This air entrance leads to the cover of the supercharger air entrance 12. The outer cover 13 contains the supercharger 14 which delivers air into the individual passages 15 containing the individual throttles 16 connected by a rod 17 to an arm 18 mounted on the rack 19 which controls the fuel supply of the fuel pump 35. The air, after passing the throttle valve 16 flows by the inlet valve 31 into the engine cylinder.

The control of the fuel pump is obtained as follows:

In one or more of the individual inlet passages 15 on the engine side of the throttle 16, a restricted port 29 is provided leading through a pipe 40 to a chamber 28 which contains a bellows 48. The enclosed chamber 24 within the bellows 48 is in communication through a passage 42 which forms the outlet from the fuel pump 25. The fuel passes into the chamber 24 where its pressure is regulated and issues through the pipe 23. A needle valve 26 regulates the pressure in the chamber 24 by controlling the by-pass or relief opening 43. This needle valve 26 is connected to the bellows 48 and is supported by the spring 30. The fuel enters from the inlet pipe 27 which is connected with a return pipe 44 which also returns any leakage of fuel past the shaft 45 which carries the rack 19. This shaft 45 is connected to a flexible diaphragm 20 which is subject on its left hand side to the pressure in the chamber 24, because the chamber 21, of which the diaphragm 20 forms the right hand wall, is connected through the pipe 23 with the chamber 24. A vacuum chamber 22 on the right hand side of the diaphragm 20 contains a compression spring 34 corresponding in its effect to the compression spring 30.

A restriction 33 in the pipe 23 is located between the pipe 32 and the chamber 21. The pipe 32 leads to the metering pump 35 and thus supplies the fuel necessary for the engine. A return pipe 46 returns the excess fuel from the fuel metering pump 35 to the return pipe 44. A rocker arm 36 operated by a cam 37 on a cam shaft 38 operates the fuel pump 35. This, of course, is no part of this invention and is merely indicated to show one rather well known type of fuel pump as illustrated in the Truxell Patent 2,144,862, now used in connection with Diesel engines. A somewhat simpler pump could probably be used for fuel injection as the pressures need not be anything like as high in this fuel injection engine as they necessarily must be with some other types of fuel injection engines.

Operation

The pressure in the pipe 23 is equal to a constant due to the adjustment of the spring 30 plus the variable dependent on the pressure transmitted through the pipe 40 to the chamber 28. This variable represents the pressure in the inlet passage 15 at the time the cylinder is full and the inlet valve 31 closes and therefore, the pressure acting on the bellows 48 reflects the pressure in the air entrance. Therefore, the pressure in the chamber 21 also reflects the pressure in the air entrance. The chamber 22 on the right hand side of the diaphragm 20 has been evacuated so that a vacuum exists therein, and a spring 34 supports the diaphragm 20 and corresponds to the spring 30. Hence the fuel pressure in the chamber 21 varies with the cylinder pressure at the time the inlet valve closes. The rack 19 therefore moves to the right when the throttle 11 is opened, and permits an increased fuel discharge from the fuel pump 35. Obviously the rack and pinion in the pump 35 can be arranged to give the varying mixture ratios needed so that at part throttle the cruising lean mixture could be obtained and at maximum throttle and at sea level, the mixture ratio can be rich enough to prevent the orthodox air cooled engines burning up.

When the throttle is closed, the diaphragm 20 moves to the left, carries with it the arm 18 and the link 17 which closes the individual throttles 16. Hence if the engine is idled down not only is the rack 19 moved to the left to restrict the fuel discharge to the minimum for idling, but the individual throttles 16 are also closed so that the back rush of the exhaust gases does not unduly disturb the air supply from the supercharger 14 contained in the cover 13.

What I claim is:

1. In a fuel injection multi-cylinder engine having an inlet valve and an individual air inlet passage leading to each cylinder, an individual throttle in each air entrance, an individual engine-operated pump intermittently discharging metered quantities of fuel into each cylinder, a main fuel supply pump feeding fuel to each of these metering pumps, a pressure control chamber connected to said fuel supply pump, automatic control means for varying the discharge from each metering pump comprising a fuel chamber, a moving wall forming one wall of said chamber and connected to said control means, a vacuum chamber on the other side of said moving wall, a pipe freely connecting the fuel chamber with the pressure control chamber, a restricted outlet from said fuel chamber leading to said metering pump, pressure control means for said control chamber responsive to the pressure in the air entrance on the engine side of said individual throttles and adapted to maintain the pressure in said control chamber at a constant pressure added to the absolute pressure of the air entering said cylinder, a compression spring in each of said vacuum chambers, said compression spring creating a pressure substantially equal to the pressure in the pressure control chamber, said individual moving walls being also connected to said individual throttles whereby when each of the walls moves to admit more fuel as the pressure at the entrance to the engine inlet valve increases, the individual throttles are opened wider, and when each of the walls moves to decrease the fuel supply as the engine is throttled, it simultaneously throttles the individual air throttle to which it is connected and so throttles the air flowing to the inlet valve, a common air entrance, a throttle valve therein, and a supercharger located between said common air entrance and the individual air entrances leading to said cylinders.

2. In a multi-cylinder fuel injection engine having an inlet valve and an inlet passage leading to each cylinder, individual engine operated pumps adapted to discharge metered quantities of fuel into each cylinder, a main fuel supply pump, a fuel passage adapted to feed fuel to each of said metering pumps, automatic control means for varying the quantity of fuel discharged from each pump at each stroke comprising a fuel chamber, a moving wall forming a wall of said chamber connected to said control means, a pipe connecting said fuel chamber with the outlet of said fuel supply pump, a passage from said chamber to said metering pump, a restriction in said passage, pressure control means for said supply pump responsive to the pressure in the air entrance adapted to maintain the outlet pressure of the fuel supply pump a definite number of pounds per square inch higher than the absolute pressure at the said air entrance leading to said inlet valve, a vacuum chamber on the other side of said moving wall, a spring supporting said moving wall, said spring balancing a pressure in said fuel chamber equal to the pressure maintained in the fuel outlet from said supply pump whereby the moving wall is moved to admit more fuel as the pressure of the air at the inlet valve increases and consequently the pressure at the outlet from the main fuel supply pump increases.

3. In a fuel injection engine, an engine cylinder having an inlet valve and an air inlet passage leading to said cylinder, an automatically operated throttle in the air entrance to said cylinder, a supercharger adapted to deliver air to said inlet passage, an air entrance to said supercharger, a manually operated throttle valve located therein, an engine operated pump intermittently discharging metered quantities of fuel into said cylinder, a main fuel supply pump feeding fuel to said metering pump, a pressure control chamber connected to the outlet from said fuel supply pump, automatic control means for varying the discharge from said metering pump comprising a fuel chamber, a moving wall forming one wall of said chamber and connected to said control means, a vacuum chamber on the other side of said moving wall, a pipe freely connecting the fuel chamber with the pressure control chamber, a restricted outlet from said fuel chamber leading to said metering pump, pressure control means for said control chamber responsive to the pressure in the air entrance on the engine side of said throttle and adapted to maintain the pressure in said control chamber at a constant pressure added to the absolute pressure of the air entering said cylinder, a spring in said vacuum chamber, said spring balancing a pressure in said fuel chamber substantially equal to the pressure in the pressure control chamber, means connecting said moving wall with said automatically operated throttle whereby, when said manually operated throttle is opened the automatically controlled throttle and the automatic control means for said metering pump are both moved to admit more air and fuel and the fuel is admitted in proportion to the increase in the density of the air admitted to said cylinder.

4. In a multi-cylinder fuel injection engine having a supercharger, an air entrance leading thereto, a throttle in said entrance, air exits leading from said supercharger to said cylinders, engine operated metering fuel pumps adapted to discharge fuel charges for each cylinder, a fuel supply pump adapted to deliver fuel under a variable fuel pressure to all of said metering fuel pumps, mechanical means for varying the quantity discharged by each individual fuel pump responsive to said variable fuel pressure, control means for regulating said variable fuel pressure responsive to the pressure created by said supercharger.

5. In a device as set forth in claim 4 in which individual throttles are located in the supercharger exits leading to each cylinder, said mechanical fuel control means being also connected to said individual throttles so that when the fuel charge is reduced to a minimum the individual throttles are closed to the position admitting the minimum quantity of air.

6. In a fuel injection system for an internal combustion engine, an engine cylinder having an inlet valve, and air inlet passage leading to the cylinder of said engine, a fuel injection pump operated by the engine and adapted to discharge a metered quantity of fuel into said cylinder during each cycle, a supercharger adapted to deliver air under pressure to said air inlet passage, an air entrance to said supercharger, a manually operated throttle valve located therein, means for supplying fuel under pressure to said fuel injection pump, automatic control means for varying the quantity of fuel discharged by said fuel injection pump responsive to the pressure of said main fuel supply, means for varying pressure in said fuel supply responsive to the changes in the pressure created by said supercharger, a pipe leading from said fuel supply means to said fuel injection pump, a restriction in said pipe, a connection between said restriction and said fuel supply leading to a chamber having a movable wall, a vacuum chamber on the other side of said movable wall, a spring supporting said movable wall, control means for said fuel injection pump connected to said movable wall, whereby an increase in pressure from the supercharger creates an increased pressure in the fuel supply system and thereby increases the discharge from said fuel injection pump.

7. In a multi-cylinder fuel injection engine having an inlet valve and an inlet passage leading to each cylinder, individual engine operated fuel injection pumps adapted to discharge metered quantities of fuel into each cylinder, a supercharger adapted to deliver air to said air inlet passage, an air entrance to said supercharger, a manually operated throttle valve located therein, a supply of fuel under pressure, a fuel passage adapted to lead fuel from said fuel supply to each of said fuel injection pumps, automatic control means for varying the quantity of fuel discharged into each pump at each stroke comprising a fuel chamber, a movable wall forming a wall of said chamber connected to said control means, a pipe connecting said fuel chamber with said fuel supply under pressure, a vacuum chamber on the other side of said movable wall, a spring supporting said wall, means for varying the pressure of said fuel supply comprising a pressure relief valve, a moving wall carried by the valve, a chamber subjected to the pressure of the fuel supply means, an additional load supplementing the pressure of the supercharger and also adapted to apply pressure to said valve to regulate the pressure of the fuel supply means whereby the pressure on the fuel is a constant number of pounds per square inch higher than the pressure in the air entrance leading to said air inlet valve.

STANLEY M. UDALE.

DISCLAIMER 2,290,921.—*Stanley M. Udale*, Detroit, Mich. FUEL INJECTION SYSTEM. Patent dated July 28, 1942. Disclaimer filed October 19, 1944, by the inventor; the assignees, *George M. Holley* and *Earl Holley*, consenting.

Hereby disclaims claim 4 of the patent.

[*Official Gazette November 14, 1944.*]